(12) United States Patent
Balakrishnan et al.

(10) Patent No.: US 12,298,575 B2
(45) Date of Patent: May 13, 2025

(54) AERIAL DROP OPTICAL FIBER CABLE

(71) Applicant: Sterlite Technologies Limited, Haryana (IN)

(72) Inventors: Jitendra Balakrishnan, Haryana (IN); Raj Gangwar, Haryana (IN)

( * ) Notice: Subject to any disclaimer, the term of this patent is extended or adjusted under 35 U.S.C. 154(b) by 239 days.

(21) Appl. No.: 18/081,077

(22) Filed: Dec. 14, 2022

(65) Prior Publication Data
US 2023/0185041 A1    Jun. 15, 2023

(51) Int. Cl.
*G02B 6/44* (2006.01)
(52) U.S. Cl.
CPC .............. *G02B 6/441* (2013.01); *G02B 6/443* (2013.01); *G02B 6/4433* (2013.01); *G02B 6/44384* (2023.05); *G02B 6/4422* (2013.01)
(58) Field of Classification Search
CPC .................................................... G02B 6/441
See application file for complete search history.

(56) References Cited

FOREIGN PATENT DOCUMENTS

| CN | 112731603 A | * | 4/2021 | ........... G02B 6/4432 |
|---|---|---|---|---|
| EP | 2312359 A1 | * | 4/2011 | ............. G02B 6/441 |
| EP | 3451036 A1 | * | 3/2019 | ........... G02B 6/4429 |

OTHER PUBLICATIONS

Translation of CN112731603A (Year: 2021).*
Translation of EP2312359A1 (Year: 2011).*

* cited by examiner

*Primary Examiner* — Chad H Smith
(74) *Attorney, Agent, or Firm* — Steven R. Fairchild

(57) ABSTRACT

The present invention provides an optical fiber cable (100) having a plurality of optical waveguides (102), one or more cylindrical retaining elements (104) housing the plurality of optical waveguides (102), a sheath (106) enclosing the one or more cylindrical retaining elements (104) and embedded strength members (108). In particular, the one or more cylindrical retaining elements (104) has a filling coefficient between 0.5 to 0.8. And, the filling coefficient is a ratio of cross-sectional area of the plurality of optical waveguides (102) inside a cylindrical retaining element (104) and inner cross-sectional area of the cylindrical retaining element (104). The ratio of breaking load of a cylindrical retaining element (104) to an embedded strength member (108) is less than or equal to 1.

19 Claims, 3 Drawing Sheets

AERIAL DROP OPTICAL FIBER CABLE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This application claims the benefit of Indian Patent Application No. 202111058474 filed on Dec. 15, 2021, and incorporated herein by reference.

FIELD

The present invention relates to the field of optical fiber cables, and more particularly, relate to an aerial drop optical fiber cable with optimized breaking load components.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Over the last few years, there has been an exponential growth in waveguide to the subscriber applications due to an increase in demand for high speeds and bandwidth. The waveguide to the subscriber applications require a broadband optical waveguide distribution network. The optical waveguide distribution network includes optical waveguide distribution cables. Optical fiber communications is seen as one of the most reliable telecommunication technologies to achieve consumers' needs for present and future applications. It is reliable in handling and transmitting data through hundreds of kilometers with an acceptable bit error rate and today, optical fiber communication dominates as the physical medium for medium and long distance data transmission systems and telecommunications networks.

An optical fiber (i.e., a glass fiber typically surrounded by one or more coating layers) conventionally includes an optical fiber core, which transmits and/or amplifies an optical signal, and an optical cladding, which confines the optical signal within the core. Accordingly, the refractive index of the core nc is typically greater than the refractive index of the optical cladding ng (i.e., nc>ng).

Traditionally, aerial optical fiber cables are desirable for use in the waveguide to the subscriber applications including fiber-to-the-home, fiber-to-the-premises, or fiber-to-the-node broadband communications networks. These are especially worthwhile in construction of such high-speed networks in small towns and rural areas, where communications services are most economically provided using an existing aerial right of way. These aerial optical fiber cables form an external link between a distribution cable and the subscriber. These aerial optical fiber cables are used for aerial installation and clamped on poles.

Typically, these aerial optical fiber cables include a number of cylindrical retaining elements inside a core of the optical waveguide cable, water swellable yarns and an outer jacket. In addition, these aerial optical fiber cables include embedded robust components embedded inside the outer jacket. The embedded robust components may be made of brass coated steel wire. For example, a micromodule telecommunication cable includes a plurality of optical fibers grouped in micromodules. A micromodule may contain about 2 to 24 fibers enclosed in a flexible retaining jacket. The jackets for retaining the micromodules and the jackets of optical fibers may be colored to facilitate location of the fibers in the cable, (e.g., during connection operations).

Chinese patent application no. CN113406757A titled "Butterfly-shaped optical cable and preparation method thereof" discloses an optical fiber cable with break load of 1000-1500 N. In particular, the strength member has a break load of 500-600 N.

U.S. Pat. No. 7,783,147B2 titled "Optical fibre drop cables" discloses an optical fiber cable with break load of about 2000 N. In particular, the reinforcing sleeve may house one or more elongate containers, preferably plastic tubes, for housing optical fibers.

U.S. Pat. No. 8,116,604B2 titled "Telecommunication optical fiber cable" discloses a telecommunication optical fiber cable possessing a longitudinal central cavity that receives micromodules of optical fibers positioned in parallel. In particular, a jacket surrounds the central cavity and a sheath is positioned on the inner periphery of the jacket.

Chinese patent application no. CN102549466B titled "optical communication cable and manufacturing process" discloses an optical cable for communicating including at least one micromodule having a holding element and the N number of optical fiber being contained in the holding element.

However, there are a number of drawbacks in the currently similar technologies employing aerial optical fiber cables having retaining elements. The aerial optical fiber cables exert force on the poles on which the cables are clamped whenever any external load is applied on the cable. This leads to poles being broken and damaged which increases the maintenance cost. Moreover, the currently employed aerial optical fiber cables do not allow easy access to waveguides. Furthermore, these aerial optical fiber cables are not round in shape thereby not allowing the cables to be easily installed in ducts. The aerial optical fiber cables cannot be blown or pulled easily inside the duct to a non-round shape. The material used for the core of the optical fiber cable does not facilitate easy installation of the optical fiber cable.

Additionally, the prior art does not mention the break load of the cylindrical enclosure and/or the strength members as well as the ratio. Also, the strength members employed in the prior arts are non-metallic in nature.

Accordingly, to overcome the disadvantages of the prior art, there is an urgent need for a technical solution that overcomes the above stated limitations in the prior arts. Thus, the present invention focuses on an aerial drop optical fiber cable with optimized breaking load components.

SUMMARY OF THE INVENTION

Embodiments of the present invention relates to an optical fiber cable comprising a plurality of optical waveguides, one or more cylindrical retaining elements housing the plurality of optical waveguides and a sheath enclosing one or more cylindrical retaining elements. In particular, one or more cylindrical retaining elements has a filling coefficient between 0.5 to 0.8. Moreover, the filling coefficient is a ratio of cross-sectional area of the plurality of optical waveguides inside a cylindrical retaining element of one or more cylindrical retaining elements and inner cross-sectional area of the retaining element of one or more cylindrical retaining elements. Furthermore, the sheath has one or more embedded strength members. Further, a ratio of breaking load of a cylindrical retaining element to an embedded strength member is less than or equal to 1.

In accordance with an embodiment of the present invention, the filling coefficient is in a range of 0.57 to 0.8 when the plurality of optical waveguides has a diameter in a range of 200 um+−20 um.

In accordance with an embodiment of the present invention, the filling coefficient is in a range of 0.6 to 0.7 when the plurality of optical waveguides has a diameter in a range of 180 um+−20 um.

In accordance with an embodiment of the present invention, the filling coefficient is in a range of 0.55 to 0.65 when the plurality of optical waveguides has a diameter in a range of 160 um+−20 um.

In accordance with an embodiment of the present invention, the filling coefficient is in a range of 0.5 to 0.65 when the plurality of optical waveguides (102) has a diameter in a range of 140 um+−20 um.

In accordance with an embodiment of the present invention, the optical fiber cable does not have a central strength member.

In accordance with an embodiment of the present invention, the optical fiber cable has a weight of less than 60 kg/km.

In accordance with an embodiment of the present invention, the optical fiber cable has a nominal diameter in a range of 4 mm to 9 mm.

In accordance with an embodiment of the present invention, one or more embedded strength members are stranded brass plated steel wires. Each of one or more embedded strength members has a breaking load in a range of 500 N to 700 N.

In accordance with an embodiment of the present invention, each of one or more cylindrical retaining elements has a breaking load in a range of 3 N to 10 N.

In accordance with an embodiment of the present invention, one or more embedded strength members are two. The one or more embedded strength members are positioned 180 degrees apart.

In accordance with an embodiment of the present invention, the optical fiber cable resists electrical tracking and erosion under a voltage stress of at least 7 kV and ammonium Chloride contamination flow rate of 0.9 ml/min for at least 6 hours.

In accordance with an embodiment of the present invention, the ratio of breaking load of a cylindrical retaining element to an embedded strength member is between 0.004 to 0.2.

The foregoing objectives of the present invention are attained by employing an aerial drop optical fiber cable with optimized breaking load components.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
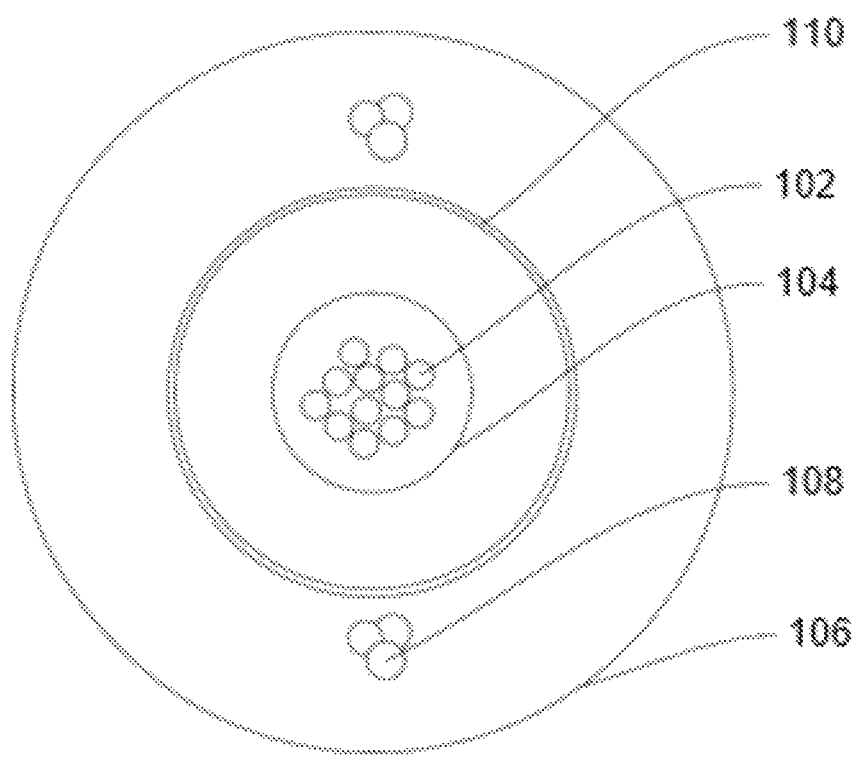
Figure 2:
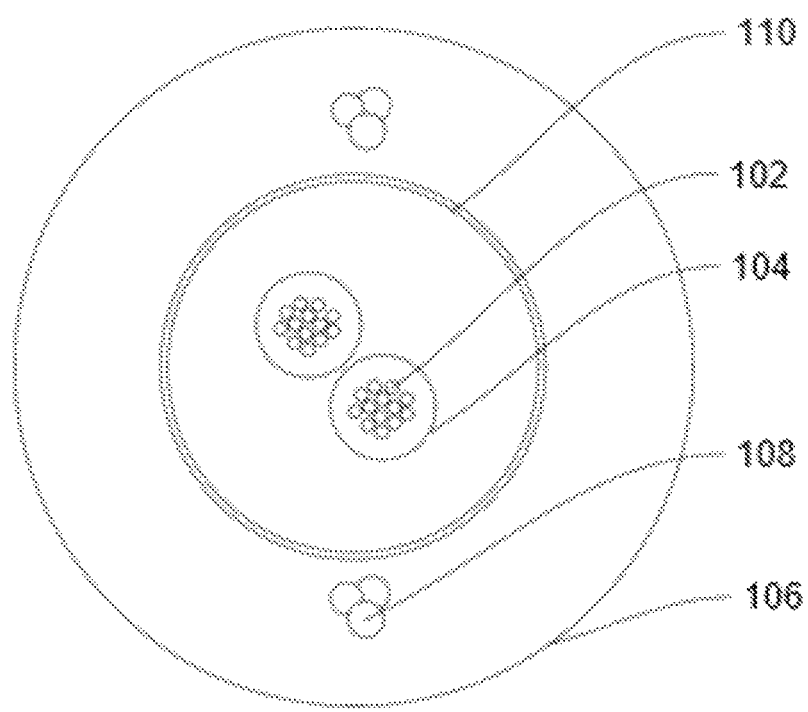
Figure 3:
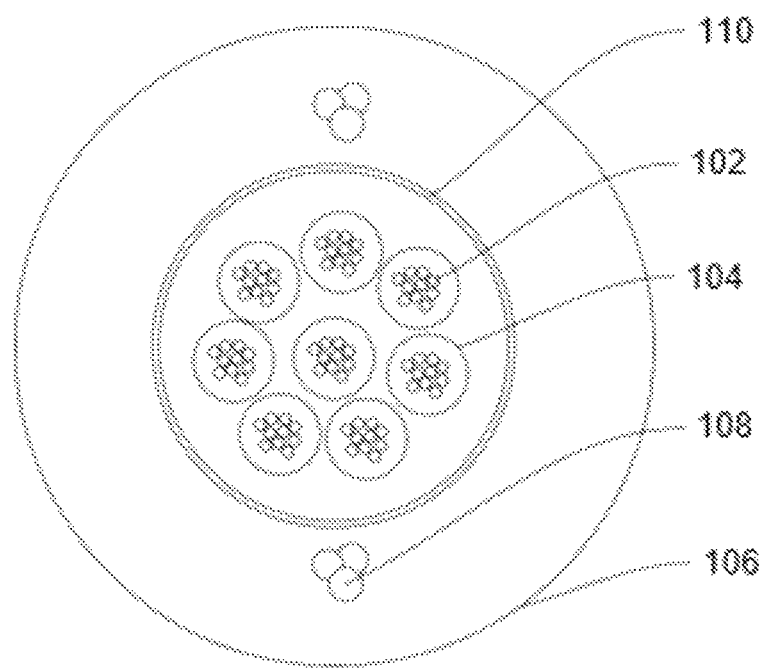

The invention herein will be better understood from the following description with reference to the drawings, in which:

FIG. 1 is a pictorial snapshot illustrating a cross sectional view of an optical fiber cable with one cylindrical retaining element, in accordance with an embodiment of the present invention;

FIG. 2 is a pictorial snapshot illustrating a cross sectional view of the optical fiber cable with two cylindrical retaining elements, in accordance with an embodiment of the present invention;

FIG. 3 is a pictorial snapshot illustrating a cross sectional view of the optical fiber cable with a plurality of cylindrical retaining elements, in accordance with an embodiment of the present invention.

ELEMENT LIST

Optical fiber cable—100
Plurality of optical waveguides—102
One or more cylindrical retaining elements—104
Sheath—106
One or more embedded strength members—108
Water blocking element—110

The optical fiber cable illustrated in the accompanying drawings, which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE PREFERRED EMBODIMENTS

For a more complete understanding of the present invention, the objects and advantages thereof, reference is now made to the ensuing descriptions taken in connection with the accompanying drawings briefly described as follows.

The principles of the present invention and their advantages are best understood by referring to FIGS. 1-3. In the following detailed description numerous specific details are set forth in order to provide a thorough understanding of the embodiment of invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present disclosure:

Breaking load of cable is the minimum load at which the component will break when the ends of the cable are prevented from rotational and other external forces generated at clamped portion of aerial installation.

The cable weight refers to the nominal weight of the optical fiber cable.

Electrical breakdown on the surface of an insulating material wherein an initial exposure to electrical arcing heat carbonizes the material.

FIG. 1 illustrates a cross sectional view of an optical fiber cable 100, in accordance with an aspect of the present invention. In general, the optical fiber cable 100 is a network cable that contains strands or array of glass waveguides inside a protective casing. The glass waveguides are used to carry optical signals. The insulated casing facilitates the protection of the waveguides from heat, cold, unwanted disturbances and external interference from other types of wiring. The insulated casing provides protection to the optical fiber cable 100 from ultraviolet rays of sun. The optical fiber cable 100 is designed for long distance transmission of optical signal. The optical fiber cable 100 enables very high speed data transmission. The optical fiber cable 100 transmits data at a higher speed than copper data cable. The optical fiber cable 100 transmits data at much higher bandwidth than copper data cable.

The optical fiber cable 100 is a light weight optical fiber cable 100. In general, the light weight optical cables are employed for aerial installations. The optical fiber cable 100 is a self-supporting cable. The optical fiber cable 100 is specially designed for easy and economical aerial installation. The optical fiber cable 100 is used for a wide variety of applications. The wide variety of applications includes high speed internet, data transmission, optical sensor, intercommunication, optical circuit installations and the like. The optical fiber cable 100 is very less susceptible to interference.

The optical fiber cable 100 is associated with a longitudinal axis (not shown in figure). The longitudinal axis of the optical fiber cable 100 passes through a geometrical center of the cross section of the optical fiber cable 100. The optical fiber cable 100 is a single mode optical waveguide cable. In an aspect of the present invention, the optical fiber cable 100 is a multimode optical fiber cable. In general, the optical fiber cable 100 is used for installation in ducts and micro ducts. In addition, the optical fiber cable 100 is used for indoor and outdoor applications.

Referring to FIG. 1, FIG. 2 and FIG. 3. The optical fiber cable 100 includes a plurality of optical waveguides 102, one or more cylindrical retaining elements 104, a sheath 106, one or more embedded strength members 108 and a water blocking element 110. The combination of structural elements enables an improvement in a plurality of parameters of the optical fiber cable 100. The plurality of parameters includes attaining required breaking load, crush resistance, impact strength, torsion, transmission characteristics and the like. In particular, the plurality of optical waveguides 102 is substantially present along the longitudinal axis of the optical fiber cable 100. Moreover, each of the plurality of optical waveguides 102 is a light transmission element (also referred to as optical waveguide) is a light transmission element used for transmitting information as light pulses from one end to another. Further, each of the plurality of optical waveguides 102 is a thin strand of glass capable of transmitting optical signals transmitting large amounts of information over long distances with relatively low attenuation.

Each of the plurality of optical waveguides 102 is configured to transmit large amounts of information or data over long distances with high speed. In an aspect, the plurality of optical waveguides 102 is at least one of loose optical fibers, IBRs, flat ribbons optical fiber, rollable ribbon optical fiber and the like. Each of the plurality of optical waveguides 102 includes a core region and a cladding region. In particular, the core region is an inner part of an optical waveguide and the cladding section is an outer part of the optical waveguide. Moreover, the core region is defined by a central longitudinal axis of each of the plurality of optical waveguides 102. Further, the cladding region surrounds the core region.

Each of the plurality of optical waveguides 102 is made of silicon glass. Alternatively, each of the plurality of optical waveguides 102 is made of any other suitable material of the like.

Each of the plurality of optical waveguides 102 is a single mode optical waveguide. Alternatively, each of the plurality of optical waveguides 102 is a multimode optical waveguide.

The wavelength of light traveling through each of the plurality of optical waveguides 102 lies in a range of about 1285 nanometer to 1625 nanometer with a cutoff wavelength of 1260 nanometers. Alternatively, the wavelength of light traveling through each of the plurality of optical waveguides 102 lies in any other suitable range.

The one or more cylindrical retaining elements 104 are positioned substantially along the longitudinal axis of the optical fiber cable 100 extending along the entire length of the optical fiber cable 100. In particular, one or more cylindrical retaining elements 104 are positioned in the core of the optical fiber cable 100 to provide a sound covering to light transmissions elements of the optical fiber cable 100. In one aspect of the present invention, the one or more cylindrical retaining elements 104 concentrically surround the plurality of the optical waveguides 102 of the optical fiber cable 100. The plurality of optical waveguides 102 are randomly arranged inside the one or more cylindrical retaining elements 104.

The one or more cylindrical retaining elements 104 meet an optimal requirement of dimensions to facilitate free arrangement of the plurality of optical waveguides 102. Particularly, the one or more cylindrical retaining elements 104 are micromodules providing primary protection to the optical elements. The one or more cylindrical elements 104. The micromodules are tubes with low break load of composition material in order to facilitate easy installation, cylindrical enclosures with reduced strength are desired as they do not need any sophisticated tools for tearing. Moreover, the one or more cylindrical retaining elements 104 has a breaking load of 3-10 N. Further, the micromodules are filled with water blocking gel.

In an aspect, the one or more cylindrical retaining elements 104 is filled with water blocking gel. The water blocking gel prevents water from passing through the one or more cylindrical retaining elements 104. Alternatively, the one or more cylindrical retaining elements 104 may be formed without the water blocking gel.

Each of the one or more cylindrical retaining elements 104 has a breaking load in a range of 3 N to 10 N. In particular, each of the one or more cylindrical retaining elements 104 has a filling coefficient is in a range of 0.5 to 0.8. The filling coefficient is a ratio of cross-sectional area of the plurality of optical waveguides 102 inside a cylindrical retaining element of the one or more cylindrical retaining elements 104 and inner cross-sectional area of the retaining element of the one or more cylindrical retaining elements 104.

In one aspect, the filling coefficient of the one or more cylindrical retaining elements 104 is in a range of 0.57 to 0.8 when the plurality of optical waveguides 102 has a diameter in a range of 200 um+−20 um. In an alternate aspect, the filling coefficient of the one or more cylindrical retaining elements 104 is in a range of 0.6 to 0.7 when the plurality of optical waveguides 102 has a diameter in a range of 180 um+−20 um. In yet another aspect, the filling coefficient of the one or more cylindrical retaining elements 104 is in a range of 0.55 to 0.65 when the plurality of optical waveguides 102 has a diameter in a range of 160 um+−20 um. In yet another aspect, the filling coefficient of the one or more cylindrical retaining elements 104 is in a range of 0.5 to 0.65 when the plurality of optical waveguides 102 has a diameter in a range of 140 um+−20 um.

The sheath 106 surrounds the one or more cylindrical retaining elements 104 is an outermost layer of the optical fiber cable 100 providing protection to the optical fibre cable 100 from environmental conditions such as but may not be limited to rainfall, snowfall, wind, and sunlight.

The strength member provides mechanical strength to the optical fiber cable 100. Each of the one or more embedded strength members 108 is embedded in the sheath 106. Number of the one or more embedded strength members 108 in the sheath 106 may vary. Moreover, each bundle of the one or more embedded strength members 108 includes a plurality of brass coated steel wire twisted together. The brass coated steel wire of the one or more embedded strength members 108 is coated with ethylene acrylic acid. In an aspect of the present invention, the brass coated steel wire of each robust component of the one or more embedded strength members 108 is coated with any other suitable material of the like. Further, the one or more embedded strength members 108 are characterized by a breaking load in a range of about 500 to 600 Newton. Alternatively, the breaking load of the one or more embedded strength members 108 lies in any other suitable range of the like.

In accordance with an embodiment of the present invention, two bundles of the one or more embedded strength members 108 are embedded 180° apart from one another. In particular, the one or more embedded strength members 108 are embedded in the sheath 106 in pairs of bundles. Each pair of bundles is embedded in the sheath 106 diametrically opposite to one another.

In an aspect of the present invention, one pair of bundles of the one or more embedded strength members 108 is embedded diametrically opposite to one another in the sheath 106. In another embodiment of the present invention, a plurality of pairs of bundles of the one or more embedded strength members 108 is embedded diametrically opposite to one another. Alternately, the one or more embedded strength members 108 are embedded in the sheath 106 in any other suitable pattern of the like.

In general, the brass coating facilitates the protection of the steel wire from corrosion and provides required final tensile strength and break load with maintained third diameter as per application requirements. The coating of ethylene acrylic acid improves a plurality of desirable properties of the brass coated steel wire and provides necessary wire-to-rubber adhesion properties to steel wire. Further, the ethylene acrylic coating improves the adhesion of brass plated steel wire to the jacket material. Combining properties of the brass coating and the ethylene acrylic coating, brass plated steel wire exhibits a plurality of properties. The plurality of properties includes water resistance, flexibility, crystallinity, chemical resistance and the like.

The water blocking element 110 prevents water ingression in the one or more cylindrical retaining elements 104. The water blocking element 110 may be located in a core of an optical fiber cable 100. Particularly, the water blocking element 110 may have a weight as 9000 Denier. Alternatively, the water blocking element 110 may have other suitable weight.

In one embodiment, the ratio of breaking load of the one or more cylindrical retaining element 104 to the one or more embedded strength members 108 is less than or equal to 1. Alternately, the ratio of breaking load of the one or more cylindrical retaining element 104 to the one or more embedded strength members 108 is between 0.004 to 0.2.

In an aspect of the present invention, the ratio of breaking load of the one or more cylindrical retaining elements 104 to the one or more embedded strength members 108 lies in any other suitable range of the like. In optical airdrop cables, break load of core elements such as micromodules is kept low as compared to the strength members to support easy installation. The optical fiber cable 100 is characterized by a nominal diameter.

In an aspect, the nominal diameter of the optical fiber cable 100 lies in a range of about 4.0 millimeters to 9.0 millimeters. Alternatively, the nominal diameter of the optical fiber cable 100 lies in any other suitable range of the like. The nominal diameter is the external diameter of the optical fiber cable 100.

In an aspect, the cable weight of the optical fiber cable 100 is 60 kg per kilometer. In another aspect of the present invention, the cable weight of the optical fiber cable 100 lies in any other suitable range.

In an aspect, the optical fiber cable 100 resists electrical tracking and erosion under a voltage stress of at least 7 kV. In another aspect of the present invention, the optical fiber cable 100 resists electrical tracking and erosion under a voltage stress in any other suitable range. In addition, the optical fiber cable 100 is characterized by ammonium chloride contamination flow rate of the optical fiber cable 100 is 0.9 ml/min for at least 6 hours. In another aspect of the present invention, the ammonium chloride contamination flow rate of the of optical fiber cable 100 lies in any other suitable range.

In an aspect, the optical fiber cable 100 does not have a central strength member.

Advantageously, the optical fiber cable 100 has optimized breaking load components with robust components of brass coated steel wire and low break load cylindrical retaining elements.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

The foregoing description comprises illustrative embodiments of the present invention.

As will be appreciated, the foregoing objects and examples are exemplary and embodiments need not meet all or any of the foregoing objects, and need not include all or any of the exemplary features described herein. Additional aspects and embodiments within the scope of the claims will be devised by those having skill in the art based on the teachings set forth herein.

While the invention has been described in connection with what are considered to be exemplary embodiments, it is to be understood that the invention is not limited to the disclosed embodiments, but on the contrary, is intended to cover various modifications and equivalent arrangements included within the spirit and scope of the appended claims.

We claim:

1. An optical fiber cable (100) comprising:
   a plurality of optical waveguides (102);
   one or more cylindrical retaining elements (104) housing the plurality of optical waveguides (102), wherein the one or more cylindrical retaining elements (104) has a filling coefficient between 0.5 to 0.8; and
   a sheath (106) enclosing the one or more cylindrical retaining elements (104), wherein the sheath (106) has one or more embedded strength members (108);
   wherein a ratio of breaking load of a cylindrical retaining element (104) to an embedded strength member (108) is less than or equal to 1; and wherein each of the one or more cylindrical retaining elements (104) has a breaking load in a range of 3 N to 10 N.

2. The optical fiber cable (100) as claimed in claim 1, wherein the filling coefficient is a ratio of cross-sectional area of the plurality of optical waveguides (102) inside a cylindrical retaining element of the one or more cylindrical retaining elements (104) and inner cross sectional area of the retaining element of the one or more cylindrical retaining elements (104).

3. The optical fiber cable (100) as claimed in claim 1, wherein the filling coefficient is in a range of 0.57 to 0.8 when the plurality of optical waveguides (102) has a diameter in a range of 200 um+−20 um.

4. The optical fiber cable (100) as claimed in claim 1, wherein the filling coefficient is in a range of 0.6 to 0.7 when the plurality of optical waveguides (102) has a diameter in a range of 180 um+−20 um.

5. The optical fiber cable (100) as claimed in claim 1, wherein the filling coefficient is in a range of 0.55 to 0.65 when the plurality of optical waveguides (102) has a diameter in a range of 160 um+−20 um.

6. The optical fiber cable (100) as claimed in claim 1, wherein the filling coefficient is in a range of 0.5 to 0.65 when the plurality of optical waveguides (102) has a diameter in a range of 140 um+−20 um.

7. The optical fiber cable (100) as claimed in claim 1, wherein the optical fiber cable (100) does not have a central strength member.

8. The optical fiber cable (100) as claimed in claim 1, wherein the optical fiber cable (100) has a weight of less than 60 kg/km.

9. The optical fiber cable (100) as claimed in claim 1, wherein the optical fiber cable (100) has a nominal diameter in a range of 4 mm to 9 mm.

10. The optical fiber cable (100) as claimed in claim 1, wherein the one or more embedded strength members (108) is stranded brass plated steel wires.

11. The optical fiber cable (100) as claimed in claim 1, wherein each of the one or more embedded strength members (108) has a breaking load in a range of 500 N to 700 N.

12. The optical fiber cable (100) as claimed in claim 1, wherein the one or more embedded strength members (108) are two.

13. The optical fiber cable (100) as claimed in claim 1, wherein the one or more embedded strength members (108) are positioned 180 degrees apart.

14. The optical fiber cable (100) as claimed in claim 1, wherein the optical fiber cable (100) resists electrical tracking and erosion under a voltage stress of at least 7 kV.

15. The optical fiber cable (100) as claimed in claim 1, wherein the optical fiber cable (100) resists an ammonium Chloride contamination.

16. The optical fiber cable (100) as claimed in claim 15, wherein the ammonium Chloride contamination has a flow rate of 0.9 ml/min for at least 6 hours.

17. The optical fiber cable (100) as claimed in claim 1, wherein a ratio of breaking load of a cylindrical retaining element (104) to an embedded strength member (108) is between 0.004 to 0.2.

18. The optical fiber cable (100) as claimed in claim 1, wherein two bundles of the one or more embedded strength members (108) are embedded 180° apart from one another.

19. The optical fiber cable (100) as claimed in claim 1, wherein each bundle of the one or more embedded strength members (108) includes a plurality of brass coated steel wire twisted together coated with ethylene acrylic acid.

\* \* \* \* \*